US012744829B2

(12) United States Patent
Krivenok et al.

(10) Patent No.: US 12,744,829 B2
(45) Date of Patent: Sep. 22, 2026

(54) DATA STORAGE ACCESS WITH MULTI-CORE PROCESSING BASED ON CORE-AFFINED DESTINATION PORTS

(71) Applicant: Dell Products L.P., Round Rock, TX (US)

(72) Inventors: Dmitry Vladimirovich Krivenok, Dublin (IE); Eldad Zinger, Raanana (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 18/823,223

(22) Filed: Sep. 3, 2024

(65) Prior Publication Data

US 2026/0067361 A1 Mar. 5, 2026

(51) Int. Cl.

| | |
|---|---|
| ***H04L 12/46*** | (2006.01) |
| ***H04L 45/24*** | (2022.01) |
| ***H04L 47/20*** | (2022.01) |
| ***H04L 47/6295*** | (2022.01) |
| ***H04L 67/1097*** | (2022.01) |
| ***H04L 67/60*** | (2022.01) |

(52) U.S. Cl.
CPC .......... *H04L 67/1097* (2013.01); *H04L 45/24* (2013.01); *H04L 47/6295* (2013.01); *H04L 67/60* (2022.05)

(58) Field of Classification Search
CPC ..... H04L 45/24; H04L 47/6295; H04L 67/60; H04L 67/1097
See application file for complete search history.

(56) References Cited

U.S. PATENT DOCUMENTS

| | | | | |
|---|---|---|---|---|
| 11,575,607 | B2 | 2/2023 | Palermo et al. | |
| 2020/0310657 | A1 | 10/2020 | Cayton et al. | |
| 2022/0261165 | A1* | 8/2022 | Wang | G06F 3/061 |
| 2023/0179572 | A1* | 6/2023 | Kambi Ravi | H04L 63/0263 726/1 |
| 2023/0342037 | A1* | 10/2023 | Sahin | G06F 3/0659 |
| 2025/0139023 | A1* | 5/2025 | Kuttan | G06F 3/061 |

* cited by examiner

*Primary Examiner* — Christopher B Robinson
*Assistant Examiner* — Ho T Shiu
(74) *Attorney, Agent, or Firm* — BainwoodHuang

(57) ABSTRACT

A method of establishing network connections for a host computer (host) to access data storage at a data storage system (DSS) includes, by the DSS, allocating a set of M destination port identifiers (IDs) and incorporating them into a set of rules associating the IDs with corresponding core-affined receive queues, and performing receive flow steering of received host network traffic among the receive queues based on the rules. The host assigns the IDs to the network connections in a distributive manner and includes them in connection-establishment exchanges with the DSS, such that network traffic streams of the host cores use respective network connections and are consistently directed to corresponding DSS cores. The technique can provide for desired balance and alignment of storage network traffic, even in larger systems with many multi-core hosts, using only a small number of simple rules on the DSS.

20 Claims, 3 Drawing Sheets

DATA STORAGE ACCESS WITH MULTI-CORE PROCESSING BASED ON CORE-AFFINED DESTINATION PORTS

BACKGROUND

The invention is directed to the field of distributed computing systems, and in particular to distributed systems in which a set of host computers access data storage provided by a data storage system via a network.

SUMMARY

A method is disclosed of establishing a set of network connections for use by respective ones of K host cores of a host computer to access data storage provided by a data storage system having a smaller number M of DSS cores. The method includes, by the data storage system, allocating a set of M destination port identifiers and incorporating them into a set of rules associating the M destination port identifiers with corresponding ones of core-affined receive queues of the data storage system, and performing receive flow steering of received host network traffic among the core-affined receive queues based on the set of rules. The host computer assigns the M destination port identifiers to the network connections in a distributive manner and includes the assigned destination port identifiers in respective connection-establishment exchanges with the data storage system, such that network traffic streams of the respective host cores use respective network connections and are consistently directed to corresponding DSS cores. Multiple host-side deployment arrangements are described. The technique can provide for desired balance and alignment of storage network traffic, even in larger systems with many multi-core hosts, using only a small number of simple rules on the data storage system side.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
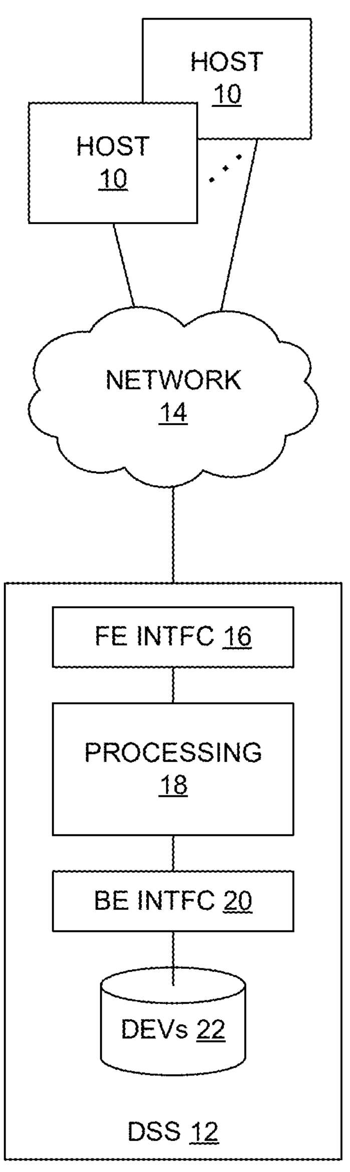
FIG. 1 is a block diagram of a computer system having a set of host computers accessing a data storage system via a network.

Modern high-performance storage protocols such as Non-Volatile Memory Express-Transmission Control Protocol (NVMe-TCP) employ multi-queue design to achieve high performance on multi-core machines with constantly increasing number of CPU cores. One unexpected side effect is the need for a large number of TCP connections and the potential problem of imbalance and misalignment of network and NVMe-TCP protocol processing across CPU cores of the data storage system. This problem occurs in part due to widespread use of a technology called Receive Side Scaling (RSS) in modern network interface cards (NICs) to distribute incoming traffic across receive queues. As described more below, RSS employs a hash-based approach to traffic distribution that does not guarantee adequate balance and alignment.

Accelerated Receive Flow Steering (aRFS) is a network technology which may be used to overcome RSS shortcomings, providing for improved balancing and protocol processing alignment to improve CPU cache utilization in front-end processing of data storage systems. However, being a hardware offload technology, aRFS has limited capabilities in terms of the number of rules it support as well as the flexibility of rule definition, which hinders the use of aRFS for NVMe-TCP protocol at enterprise scale.

In a disclosed approach, a computing system employing NVMe-TCP is made “aRFS friendly” without requiring any protocol changes by certain use of destination TCP port numbers. This can enable improved performance by using only a small number of aRFS rule slots and relatively simple rules.

The technique is described in an example NVMe-TCP environment, i.e., where NVMe-based storage access is provided over an TCP/IP network. The technique may be applicable to other protocols such as iSCSI as well. In a TCP/IP environment, every queue is implemented as a dedicated TCP connection between the host (initiator) and storage system (target). By default, each host creates multiple NVMe-TCP queues—one queue per host CPU core (or logical processor if hyperthreading is enabled). This enables the host to avoid synchronization overheads between CPU cores and achieve better scalability. Modern hosts may easily have up to 256 (sometimes even more) CPU cores. Storage systems usually provide storage to multiple hosts, which in some environments may reach into the hundreds. Thus, the problem of many per-host TCP connections can be appreciated.

To make things simpler for illustration, consider a data storage system (DSS) which has only one node and only one network port in a network interface card (NIC). When all N hosts each having K CPU cores connect to the DSS via NVMe-TCP, there will be N*K TCP connections between the hosts and the DSS, one per NVMe-TCP queue (assuming K is the same for all hosts for simplicity). One benefit of the disclosed technique is that the DSS can handle the traffic from each host in exactly the same manner, because of the use of port identifiers and independence from network addresses or other host-specific values.

Assuming that the DSS has M CPU cores for network and NVMe-TCP processing, it may generally be desired that the traffic for the N*K queues is divided evenly across the M cores. The processing of NVMe-TCP packets may be split into four main stages:

1. NIC identifies which receive queue (RXQ) to send packet to
2. CPU core associated with RXQ is interrupted and interrupt is handled
3. Softirq processing is done (usually on the same core which handled interrupt)
4. NVMe-TCP target reads data from the socket and processes the protocol For a given TCP connection T, an ideal case would be for the NIC to direct traffic to the RXQ that interrupts the same CPU core which owns the corresponding NVMe-TCP queue. In this case, all processing is fully aligned with the core, and because the DSS assures even distribution of N*K queues across M cores, all cores are evenly utilized under load.

Stages 2-4 above are configuration matters within the control of a given DSS. However, at stage 1 the NIC must direct the traffic to the correct RXQ. This is exactly where the problem is when RSS is used. RSS works by calculating a hash (usually Toeplitz hash) over the headers of incoming packets. The hash is used as an index in an indirection table to find which RXQ to pick for a particular flow. Any TCP connection T always stays affined to a particular RXQ and does not move between RXQs. However, the hash-based approach of RSS cannot guarantee balance across RXQs. Some RXQs handle more TCP connections, some will handle less. It depends only on source and destination IPs and port numbers, i.e., random data. There is no way to achieve perfect balancing with RSS. This will cause imbalances in utilization of CPU cores and will hurt performance.

A second problem is that RSS can also cause misalignment in processing. Consider an example in which TCP connection T0 has associated NVMe-TCP Q0 owned by CPU core C0. RSS calculates a hash over T0 headers and directs traffic to NIC RXQ1, which interrupts core C1. IRQ and softirq processing happens on core C1, but then the thread handling NVMe-TCP queue Q0 will read data from a corresponding socket while running on CPU core C0. This impacts CPU cache efficiency because the processing of T0 is distributed between cores C1 and C0 and is not aligned with a single core.

Generally, RSS is incapable of achieving ideal balancing across RXQs, and even in an unlikely case having TCP flows balanced across RXQs, RSS cannot guarantee alignment of end-to-end processing for a given TCP connection to a single CPU core. Thus, the hash-based technique of RSS does not address performance needs for data storage systems handling storage needs for a large number of hosts.

Embodiments

FIG. 1 is a simplified block diagram of a computer system having host computers (hosts) 10 coupled to a data storage system (DSS) 12 via a network 14. The DSS 12 is a specialized hardware platform generally including front-end interface circuitry (FE INTFC) 16, storage processing circuitry 18, back-end interface circuitry (BE INTFC) 20 and storage devices (DEVs) 22 as shown. The front-end interface circuitry 16 interfaces the DSS 12 to the network 14 and remote hosts 10, while the back-end interface circuitry 20 interfaces the storage processing circuitry 18 to the storage devices 22. In operation, the hosts 10 generate storage commands (e.g., data writes, reads) that result in storing host data on the storage devices 22 (for writes) and returning stored data to the hosts 10 (reads), as generally known. The storage processing circuitry 18 is typically a multi-processing complex having multiple processing units, each typically having multiple processing "cores", all executing specialized data storage software that uses the underlying hardware resources to realize the overall functionality of the DSS 12, also as generally known.

Figure 2:
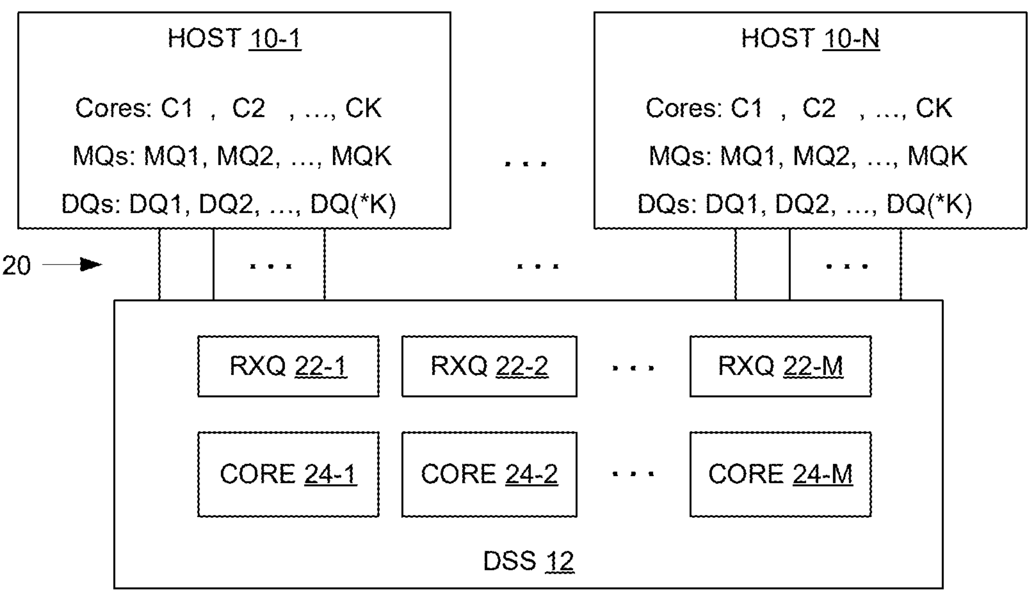
FIG. 2 is a schematic diagram of certain details of the host computers and data storage systems in relation to network connections used for storage access by the hosts.

FIG. 2 is a schematic depiction of certain logical organization used in the computing system of FIG. 1. There are assumed to be a number N of hosts 10, identified as 10-1, 10-2, . . . 10-N, each having up to another number K of processing cores C and associated storage command queues MQ, which are enumerated from 1 to K as shown. The acronym MQ is used to reflect a multipathing aspect that may be present in some embodiments, as described below. Each host 10 also includes a number of device queues DQ, enumerated from 1 to (*K), wherein *K indicates a multiple of K. Additional details regarding the organization and use of the queues MQ, DQ is given below. The host cores and queues have associated connections 20 to the DSS 12, via which the host cores transmit data storage commands and receive corresponding responses. The DSS 12 is shown as having a set of M receive queues (RXQs) 22 (enumerated 22-1 through 22-M) and a number M of processing cores 24 (enumerated 24-1 through 24-M).

It will be appreciated that the DSS 12 manages commands of a large number of connections 20, e.g., N*K for example, using a generally smaller number M of RX queues 22 and cores 24. The DSS front-end interface circuitry 16 (which contains the RX queues 22) is responsible for distributing the traffic of these connections among the RX queues 22 and cores 24 in an efficient and performant manner. A technique is described below with reference to a single host 10, and it will be understood that in a multi-host system such as that of FIGS. 1 and 2 it is generally desirable that all hosts perform the host-based functions of the technique, and the DSS 10 performs the DSS-based functions for all connected hosts 10, although of course there may be issues of configuration, compatibility, etc. that in any real system might limit use to only a subset of the connected hosts 10, for example.

Figure 3:
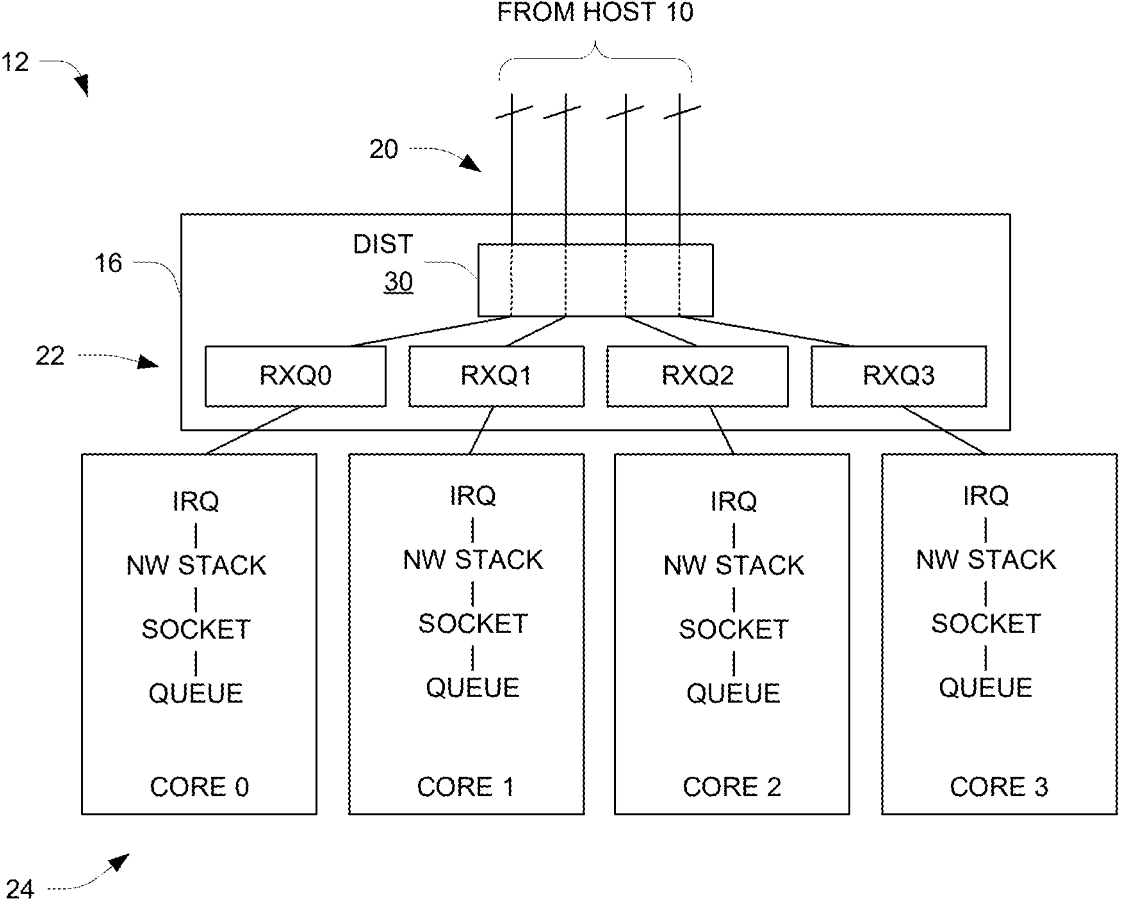
FIG. 3 is a schematic diagram showing details of the data storage system relating to distribution of traffic receive queues and processing cores.

FIG. 3 shows details of an illustrative example in which the DSS 12 has four cores 24 and the front-end interface circuitry 16 has four RX queues 22. In this example and the remaining description, items are given numeric identifiers in ranges beginning with 0, i.e., 0, 1, . . . , a scheme generally used in the computer arts. Thus the four RX queues 22 are identified as RXQ0 through RXQ3, and the cores 24 are identified as Core 0 through Core 3, etc. Each core 22 is shown as including an interrupt queue (IRQ), network stack (NW STACK), and a socket and queue which are typically included in a respective distinct processing thread executed by the core. The front-end interface circuitry 16 includes a distributor (DIST) 30 responsible for distributing traffic of the host connections 20 among the RX queues 22 and thus the respective cores 24. The RX queues 22 are "core-affined", meaning that each RX queue 22 is used for directing traffic to only the corresponding core 24. Regarding the connections 20, in FIG. 3 each individual line (of four that are shown) represents a group of multiple connections from the host 10, as is described below. As noted above, for an individual host 10 there might be as many as *K connections, with *K typically much larger than 4. In such a case, each individual line in FIG. 3 represents a set of *K/4 connections 20.

In one embodiment, the distributor 30 can be realized using a hardware acceleration function called "accelerated receive flow steering" (aRFS) which is supported by modern network interface cards (NICs). aRFS is able to perform a basic match on network packet headers and perform a limited set of actions. Actions might be dropping a packet or directing it to a specific RXQ. For example, in aRFS it is possible to deploy the following rules for traffic forwarding, where the connection numbers are Address:Port ID pairs (source→destination) as generally known:

*TCP* connection 10.0.0.10:42300 -> 10.0.0.100:4420 – direct to *RXQ*0

*TCP* connection 10.0.0.10:42308 -> 10.0.0.100:4420 – direct to *RXQ*1

-continued

*TCP* connection 10.0.0.10:42322 -> 10.0.0.100:4420 – direct to *RXQ*2

*TCP* connection 10.0.0.10:42398 -> 10.0.0.100:4420 – direct to *RXQ*3

Such functionality could be used in conjunction with the following system/DSS configuration information to realize traffic distribution as described herein:

Which RXQ interrupts which CPU core

Which NVMe-TCP Qs (host-side) are associated with which CPU core (owner core)

5-tuple for TCP connection associated with any NVMe-TCP Q

One challenge, however, is that there may be only a small number of aRFS "slots" for the required rules. It may not be possible to use a one-rule-per-connection scheme (e.g., in NVMe-TCP use-case) because N*K is much larger than the number of aRFS slots available in a NIC that implements the front-end circuitry 16. Another challenge is that an aRFS rules engine cannot be programmed to do complex analysis of network packets, which means that the rules must be based on common network fields of Ethernet, IP and TCP/UDP headers, and employ simple operations such as simple value comparison and applying a mask. Finally, another issue with rule-based traffic directing is that individual NVMe-TCP protocol data units (PDUs) lack any individual identifier, and they might not be fully accessible in any event due to things like encryption or the segmenting of PDUs across multiple TCP/IP packets (so that not all packets necessarily include a PDU header to inspect).

To overcome such limitations, the DSS 12 as NVMe-TCP target uses destination ports in a particular way. An NVMe-TCP host performs discovery via well-known registered TCP port 8009. Then it reads Discovery Log Entry to determine destination port number (TRSVCID field) of I/O controller to identify the port to connect to. In many systems, this is standard well-known port 4420, but it does not have to be, because the NVMe-TCP specification also allows NVMe-TCP I/O controllers to use Dynamic and/or Private TCP ports (i.e., ports in the TCP port number range from 49152 to 65535).

Thus, instead of advertising only one standard port 4420, the DSS 12 as NVMe-TCP target advertises multiple ports from the range above. If the NVMe-TCP target has M CPU cores 24 for network and protocol processing, then it uses M ports starting from some selected port number, e.g., 50000. This enables use of only M aRFS rules regardless of number of hosts 10 and the number of queues per host 20, to achieve desired balancing and alignment.

Figure 4:
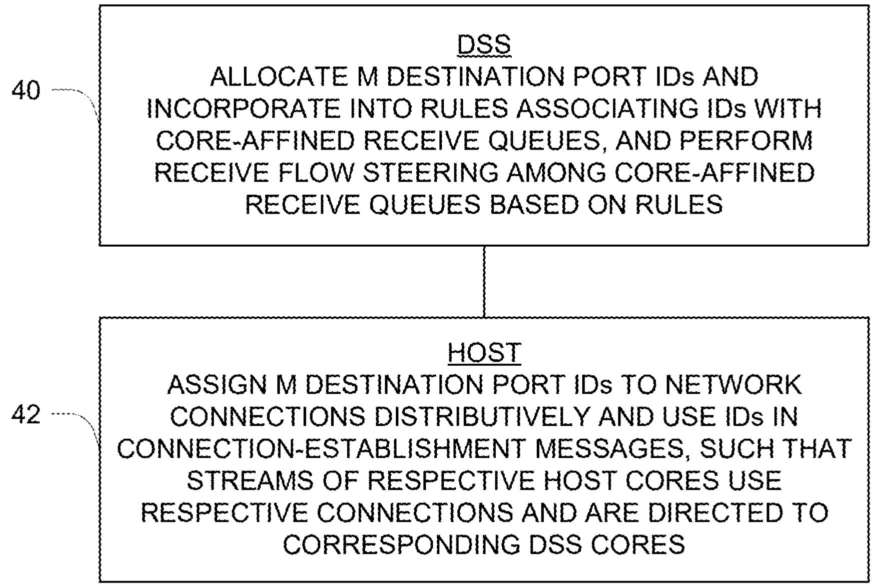
FIG. 4 is a high-level flow diagram of a process for using destination port identifiers to provide balanced and aligned use of processing cores in the data storage system.

FIG. 4 illustrates the technique at a high level. Overall, the technique is for establishing a set of network connections (e.g., 20) for use by respective ones of K host cores of a host computer (e.g., host 10) to access data storage provided by a data storage system (e.g., DSS 12) having a smaller number M of DSS cores (e.g., cores 24).

At 40, the data storage system allocates a set of M destination port identifiers (IDs) and incorporates them into a set of rules associating the M destination port identifiers with corresponding ones of core-affined receive queues (e.g., RXQs 22) of the data storage system, and performs receive flow steering of received host network traffic among the core-affined receive queues based on the set of rules.

At 42, the host computer assigns the M destination port identifiers to the network connections in a distributive manner and includes the assigned destination port identifiers in respective connection-establishment exchanges with the data storage system, such that network traffic streams of the respective host cores use respective network connections and are consistently directed to corresponding DSS cores. Here, "distributive manner" means that the destination port IDs are distributed for use among the connections according to some scheme or criteria aimed at a desired usage pattern of the DSS cores 24 for processing of storage requests from the hosts 10. The overall host-based functionality of step 42 may be realized in a variety of ways, examples of which are described below.

In an example having M=4 and port allocation beginning at 50000, the configuration of aRFS rules (at 40) can be as follows, where each rule specifies that traffic using the identified destination port ID (dst_port) is directed to the corresponding receive queue RXQ:

dst_port == 50000: direct to *RXQ*0 dst_port == 50001: direct to *RXQ*1 dst_port == 50002: direct to *RXQ*2 dst_port == 50003: direct to *RXQ*3

On the NVMe-TCP target side (DSS 12) it is required is to expose M TCP ports and associate NVMe-TCP receive queues to owner DSS cores 24 based on destination port number in the corresponding TCP connection (e.g., if TCP connection is established to port 50002, then queue will be associated with CPU core 2, etc.). The NVMe-TCP initiator (host 10) performs discovery and connects to all TCP ports it encounters in entries of a Discovery Log. Generally, this increases the number of block devices the host sees from X to X*M, where X is the number of namespaces (assuming host connects to one storage system node via one port). As noted above and described more below, there are different ways that a host 10 can deal with this multiplicity of devices and potential associated connections.

An example is used in which there are eight (8) CPU cores on a host and only one namespace. In existing techniques as described above, the NVMe-TCP host configures eight NVMe-TCP queues resulting in eight TCP connections to the standard target port 4420. Application threads running on the host will use different NVMe-TCP queues depending on which CPU core it currently running on. In the default configuration, there is a 1:1 mapping between CPU core and NVMe-TCP queue (and hence TCP connection). For example, application thread 1 uses Q1 and application thread 2 uses Q4. It is important to note that any of those threads will not be able to exceed performance of one NVMe-TCP queue handled by one DSS core on the NVMe-TCP target side (which also may be overloaded due to imbalance and misaligned caused by RSS, as described above).

With the proposed mechanism, the host 10 uses the different port numbers with its connections 20 so as to achieve both balance and alignment between the host cores Cx and respective DSS cores 24. However, the use of multiple destination port numbers essentially multiplies the number of distinct logical devices that are seen by the host 10, which gives rise to the multipathing and *K aspects of the host-side queues MQ, DQ as noted above. Four example approaches are now described for handling these aspects of the multi-port technique. In all cases, the host 10 creates a number K of first queues MQ which are associated with respective cores Cx (i.e., core C1 is associated with MQ1, core C2 with MQ2, etc.).

A first option is for the host 10 to create corresponding device queues and connections for each of the M destination ports underneath each of the first queues MQ. In this approach, each first queue MQ is for a multipathing device that utilizes M underlying devices in some multipathing manner, e.g., round-robin multipathing. This configuration is illustrated in Table 1 below. The first row shows the set of K=8 queues MQx for a multipathing device/mp0, while the next four rows show respective device queues Qx for the four port-associated devices/nvme0 through/nvme3 that arise from NVMe device discovery. In Table 1 as well as Tables 2-4 further below, the queue designators Qx refer to the device queues identified as DQx in FIG. 2, as described above.

TABLE 1

| Dev (Port) | Core 0 | Core 1 | Core 2 | Core 3 | Core 4 | Core 5 | Core 6 | Core 7 |
|---|---|---|---|---|---|---|---|---|
| /mp0 | MQ0 | MQ1 | MQ2 | MQ3 | MQ4 | MQ5 | MQ6 | MQ7 |
| /nvme0 (50000) | Q0 | Q1 | Q2 | Q3 | Q4 | Q5 | Q6 | Q7 |
| /nvme1 (50001) | Q8 | Q9 | Q10 | Q11 | Q12 | Q13 | Q14 | Q15 |
| /nvme2 (50002) | Q16 | Q17 | Q18 | Q19 | Q20 | Q21 | Q22 | Q23 |
| /nvme3 (50003) | Q24 | Q25 | Q26 | Q27 | Q28 | Q29 | Q30 | Q31 |

An example is used to illustrate. Consider application thread 1 performing I/O to /dev/mp0 multipath device. This device uses MQ1 for I/O requests submitted from CPU core 1. Internally, it performs round-robin dispatch of I/O across 4 devices, using NVMe-TCP queues Q1, Q9, Q17 and Q25 and hence different TCP connections. The NVMe-TCP traffic is fully balanced and aligned to a respective owner core 24 on the target side due to its use of aRFS rules as described above. Moreover, the benefit of this approach is that a single application thread is now capable of exceeding the performance of a single core on the target side, by distributing its requests among the M cores by multipathing operation.

A second option is for the host 10 to create M*K device queues (as above) but not employ multipathing. In this configuration, the multipath device (e.g., /mp0) simply selects and uses only one underlying device and its associated device queue. Table 2 is used to illustrate for the same M=4, K=8 example. 32 device queues are created as for option 1, but each core uses only a selected one of the four possible. It will be appreciated that a large number of queues go unused, as indicated by the strikethrough. This option may behave similar to the one-connection-per-core solution mentioned above, except that the use of aRFS rules on the target (DSS) side (described above) ensures balancing and alignment. As shown, the overall pattern across all host cores provides for use of different destination port identifiers by different subsets of the cores, e.g., 50000 by cores 0 and 1, 50001 by cores 2 and 3, etc.

TABLE 2

| Dev (Port) | Core 0 | Core 1 | Core 2 | Core 3 | Core 4 | Core 5 | Core 6 | Core 7 |
|---|---|---|---|---|---|---|---|---|
| /mp0 | MQ0 | MQ1 | MQ2 | MQ3 | MQ4 | MQ5 | MQ6 | MQ7 |
| /nvme0 (50000) | Q0 | Q1 | ~~Q2~~ | ~~Q3~~ | ~~Q4~~ | ~~Q5~~ | ~~Q6~~ | ~~Q7~~ |
| /nvme1 (50001) | ~~Q8~~ | ~~Q9~~ | Q10 | Q11 | ~~Q12~~ | ~~Q13~~ | ~~Q14~~ | ~~Q15~~ |
| /nvme2 (50002) | ~~Q16~~ | ~~Q17~~ | ~~Q18~~ | ~~Q19~~ | Q20 | Q21 | ~~Q22~~ | ~~Q23~~ |
| /nvme3 (50003) | ~~Q24~~ | ~~Q25~~ | ~~Q26~~ | ~~Q27~~ | ~~Q28~~ | ~~Q29~~ | Q30 | Q31 |

Third and fourth options are variants of options 1 and 2 except that at connect time only K/M queues are configured for each destination port instead of K. It may be used in both a multipathing fashion (Table 3) and without multipathing (Table 4).

TABLE 3

| Dev (Port) | Core 0 | Core 1 | Core 2 | Core 3 | Core 4 | Core 5 | Core 6 | Core 7 |
|---|---|---|---|---|---|---|---|---|
| /mp0 | MQ0 | MQ1 | MQ2 | MQ3 | MQ4 | MQ5 | MQ6 | MQ7 |
| /nvme0 (50000) | Q0 | Q1 | Q0 | Q1 | Q0 | Q1 | Q0 | Q1 |
| /nvme1 (50001) | Q2 | Q3 | Q2 | Q3 | Q2 | Q3 | Q2 | Q3 |
| /nvme2 (50002) | Q4 | Q5 | Q4 | Q5 | Q4 | Q5 | Q4 | Q5 |
| /nvme3 (50003) | Q6 | Q7 | Q6 | Q7 | Q6 | Q7 | Q6 | Q7 |

TABLE 4

| Dev (Port) | Core 0 | Core 1 | Core 2 | Core 3 | Core 4 | Core 5 | Core 6 | Core 7 |
|---|---|---|---|---|---|---|---|---|
| /mp0 | MQ0 | MQ1 | MQ2 | MQ3 | MQ4 | MQ5 | MQ6 | MQ7 |
| /nvme0 (50000) | Q0 | Q1 | ~~Q0~~ | ~~Q1~~ | ~~Q0~~ | ~~Q1~~ | ~~Q0~~ | ~~Q1~~ |
| /nvme1 (50001) | ~~Q2~~ | ~~Q3~~ | Q2 | Q3 | ~~Q2~~ | ~~Q2~~ | ~~Q2~~ | ~~Q3~~ |
| /nvme2 (50002) | ~~Q4~~ | ~~Q5~~ | ~~Q4~~ | ~~Q5~~ | Q4 | Q5 | ~~Q4~~ | ~~Q5~~ |
| /nvme3 (50003) | ~~Q6~~ | ~~Q7~~ | ~~Q6~~ | ~~Q7~~ | ~~Q6~~ | ~~Q7~~ | Q6 | Q7 |

Options 3 and 4 generally require changes to NVMe-TCP connection establishment processing to request a non-standard number of queues, with the benefit that the number of queues is reduced and thus associated resource utilization (e.g., per-queue memory allocation) is reduced accordingly. All four options provide desired balancing across RXQs and alignment of NVMe-TCP queue processing to the owner CPU core 24 on the target (DSS) side. All of them require only M aRFS rules, for any number of hosts N and number of queues K.

From a configuration perspective, the DSS 12 needs to associate each NVMe-TCP queue with a respective CPU core 24 interrupted by a respective RXQ 22, according to the destination port value. It should be noted that the above rules do not depend on specific source and destination IP addresses, which means that they can be applied to all incoming traffic from any number of hosts 10. Only M rules are needed, which is both simple and efficient. The technique can be supported by any NIC that supports at least M aRFS slots. Also, no complex math is required, as the essential operation is simply inspection of destination port numbers in received traffic.

Below are some additional benefits that may be realized in embodiments:

- The approach works with existing NIC hardware and does not require increased aRFS storage or more sophisticated matching capabilities
- The approach requires only M aRFS rules to handle a much larger number N*K TCP connections, where M is typically smaller than the number of available aRFS slots
- The approach does not require any modifications in NVMe-TCP protocol and is fully compatible with encryption because it does not rely on examining data within NVMe-TCP PDUs
- The approach enables a DSS to both balance across NIC RXQs and CPU cores as well as strict alignment of NVMe-TCP queue processing to a single core, improving performance.
- In round robin multipathing configuration, this approach enables a single thread on a host side to distribute work across multiple RXQs and CPU cores on target side, potentially increasing performance
- The approach is based on industry standard technology generally supported by most/all vendors.
- Assuming that M is realized as a DSS-specific variable (rather than somehow fixed and immutable), the approach allows for changing the value of M (for example, when software upgrade is installed) which provides flexibility to storage system designers with respect to CPU cores allocation.

While various embodiments of the invention have been particularly shown and described, it will be understood by those skilled in the art that various changes in form and details may be made therein without departing from the scope of the invention as defined by the appended claims.

What is claimed is:

1. A method of establishing a set of network connections for use by respective ones of K host cores of a host computer to access data storage provided by a data storage system having a smaller total number M of data storage system cores used for network and protocol processing, comprising:

by the data storage system, allocating a set of M destination port identifiers and incorporating them into a set of M rules associating the M destination port identifiers with corresponding ones of core-affined receive queues of the data storage system, wherein each one of the M rules specifies that traffic using an identified one of the M destination port identifiers is directed to a corresponding one of the core-affined receive queues of the data storage system, and wherein M is i) the total number of cores in the data storage system that are used for network and protocol processing, ii) the total number of rules in the set of rules associating the destination port identifiers with corresponding ones of the core-affined receive queues of the storage system, and iii) the total number of allocated destination port identifiers, and performing receive flow steering of received host network traffic among the core-affined receive queues based on the set of rules; and by the host computer, assigning the M destination port identifiers to the network connections in a distributive manner and including the assigned destination port identifiers in respective connection-establishment exchanges with the data storage system, such that network traffic streams of the respective host cores use respective network connections and are consistently directed to corresponding data storage system cores.

2. The method of claim 1, further comprising, by the host computer, conducting storage device discovery with the data storage system to identify the M destination port identifiers to be used in the network connections.

3. The method of claim 2, wherein the discovery results in the host computer observing a multiplicity M of logical devices, corresponding to the M destination port identifiers, for a given storage device of the data storage system.

4. The method of claim 3, wherein the host computer configures a plurality M*K device queues for use in accessing the data storage, with respective M-size sets of the device queues being associated with respective ones of the K host cores.

5. The method of claim 4, wherein the host cores utilize their respective M-size sets of device queues in a multipathing manner, distributing storage requests among the device queues so as to correspondingly distribute the storage request among the data storage system cores of the data storage system.

6. The method of claim 4, wherein the host cores select and utilize only respective ones of their respective M-size sets of device queues to direct storage requests to the data storage system, in a pattern providing for use of different destination port identifiers by different subsets of the cores.

7. The method of claim 3, wherein the host computer configures a plurality K device queues for use in accessing the data storage, with respective K/M-size sets of the device queues being associated with respective ones of the K host cores.

8. The method of claim 7, wherein the host cores utilize their respective K/M-size sets of device queues in a multipathing manner, distributing storage requests among the device queues so as to correspondingly distribute the storage request among the data storage system cores of the data storage system.

9. The method of claim 7, wherein the host cores select and utilize only respective ones of their respective K/M-size sets of device queues to direct storage requests to the data storage system, in a pattern providing for use of different destination port identifiers by different subsets of the cores.

10. The method of claim 1 performed in a multi-host environment, wherein each host computer performs the assigning and including steps for respective connections to the data storage system, and the data storage system performs the same receive flow steering for host network traffic of all the host computers to distribute the traffic among the core-affined receive queues.

11. A host computer having a plurality K host cores to access data storage provided by a data storage system having a smaller number M of data storage system cores, the host computer being configured and operative, in connection with establishing a set of network connections for the data storage access, to:

identify a set of M destination port identifiers which have been allocated by the data storage system and incorporated into a set of rules associating the M destination port identifiers with corresponding ones of core-affined receive queues of the data storage system, wherein each one of the M rules specifies that traffic using an identified one of the M destination port identifiers is directed to a corresponding one of the core-affined receive queues of the data storage system, and wherein M is i) the total number of cores in the data storage system that are used for network and protocol processing, ii) the total number of rules in the set of rules associating the destination port identifiers with corresponding ones of the core-affined receive queues of the storage system, and iii) the total number of allocated destination port identifiers, the set of rules used by the data storage system in receive flow steering of received host network traffic among the core-affined receive queues; and assign the M destination port identifiers to the network connections in a distributive manner and including the assigned destination port identifiers in respective connection-establishment exchanges with the data storage system, such that network traffic streams of the respective host cores use respective network connections and are consistently directed to corresponding data storage system cores.

12. The host computer of claim 11, being further configured and operative to conduct storage device discovery with the data storage system to identify the M destination port identifiers to be used in the network connections.

13. The host computer of claim 12, wherein the discovery results in the host computer observing a multiplicity M of logical devices, corresponding to the M destination port identifiers, for a given storage device of the data storage system.

14. The host computer of claim 13, wherein the host computer configures a plurality M*K device queues for use in accessing the data storage, with respective M-size sets of the device queues being associated with respective ones of the K host cores.

15. The host computer of claim 14, wherein the host cores utilize their respective M-size sets of device queues in a multipathing manner, distributing storage requests among the device queues so as to correspondingly distribute the storage request among the data storage system cores of the data storage system.

16. The host computer of claim 14, wherein the host cores select and utilize only respective ones of their respective M-size sets of device queues to direct storage requests to the data storage system, in a pattern providing for use of different destination port identifiers by different subsets of the cores.

17. The host computer of claim 13, wherein the host computer configures a plurality K device queues for use in accessing the data storage, with respective K/M-size sets of the device queues being associated with respective ones of the K host cores.

18. The host computer of claim 17, wherein the host cores utilize their respective K/M-size sets of device queues in a multipathing manner, distributing storage requests among the device queues so as to correspondingly distribute the storage request among the data storage system cores of the data storage system.

19. The host computer of claim 17, wherein the host cores select and utilize only respective ones of their respective K/M-size sets of device queues to direct storage requests to the data storage system, in a pattern providing for use of different destination port identifiers by different subsets of the cores.

20. The host computer of claim 11, wherein the host computer is one host in a multi-host environment, wherein each host computer performs the assigning and including steps for respective connections to the data storage system, and the data storage system performs the same receive flow steering for host network traffic of all the host computers to distribute the traffic among the core-affined receive queues.

* * * * *